United States Patent
Mutsuda et al.

(10) Patent No.: US 11,673,162 B2
(45) Date of Patent: Jun. 13, 2023

(54) COMPOSITE MOLDED BODY AND PRODUCTION METHOD THEREFOR

(71) Applicants: DAICEL-EVONIK LTD., Tokyo (JP); NAKANO MANUFACTURING CO., LTD., Tokyo (JP)

(72) Inventors: Mitsuteru Mutsuda, Tokyo (JP); Masaru Kitada, Tokyo (JP)

(73) Assignees: DAICEL-EVONIK LTD., Tokyo (JP); NAKANO MANUFACTURING CO., LTD., Tokyo (JP)

( * ) Notice: Subject to any disclaimer, the term of this patent is extended or adjusted under 35 U.S.C. 154(b) by 42 days.

(21) Appl. No.: 17/263,081

(22) PCT Filed: Aug. 8, 2019

(86) PCT No.: PCT/JP2019/031354
§ 371 (c)(1),
(2) Date: Jan. 25, 2021

(87) PCT Pub. No.: WO2020/032170
PCT Pub. Date: Feb. 13, 2020

(65) Prior Publication Data
US 2021/0308719 A1    Oct. 7, 2021

(30) Foreign Application Priority Data
Aug. 10, 2018    (JP) .............................. JP2018-151386

(51) Int. Cl.
*B05D 7/24* (2006.01)
*B05D 7/02* (2006.01)
*C08J 7/04* (2020.01)

(52) U.S. Cl.
CPC ................ *B05D 7/24* (2013.01); *B05D 7/02* (2013.01); *C08J 7/0427* (2020.01); *C08J 2377/06* (2013.01)

(58) Field of Classification Search
None
See application file for complete search history.

(56) References Cited

U.S. PATENT DOCUMENTS

| | | | |
|---|---|---|---|
| 5,132,182 A | 7/1992 | Grosse-Puppendahl et al. | |
| 5,922,476 A | 7/1999 | Arita et al. | |
| 5,972,278 A | 10/1999 | Ito et al. | |
| 2003/0118839 A1 | 6/2003 | Ikuta et al. | |
| 2013/0318835 A1* | 12/2013 | Mutsuda | ................ B32B 27/40 525/418 |

FOREIGN PATENT DOCUMENTS

| | | |
|---|---|---|
| AU | 2003252471 A1 | 2/2004 |
| CN | 1678453 A | 10/2005 |
| JP | 3-138114 A | 6/1991 |
| JP | 9-124803 A | 5/1997 |
| JP | 2001-150618 A | 6/2001 |
| JP | 2002-273826 A | 9/2002 |
| JP | 2011-110105 A | 6/2011 |

OTHER PUBLICATIONS

International Search Report for PCT/JP2019/031354 dated Nov. 12, 2019.
Written Opinion of the International Searching Authority for PCT/JP2019/031354 (PCT/ISA/237) dated Nov. 12, 2019.
International Preliminary Report on Patentability and English translation of the Written Opinion of the International Searching Authority for International Application No. PCT/JP2019/031354, dated Feb. 25, 2021.
Chinese Office Action and Search Report for Chinese Application No. 201980050211.7, dated Jul. 13, 2022.
Extended European Search Report, dated Sep. 6, 2021, for European Application No. 19846851.4.

* cited by examiner

*Primary Examiner* — Jeffrey D Washville
(74) *Attorney, Agent, or Firm* — Birch, Stewart, Kolasch & Birch, LLP

(57) ABSTRACT

The present invention provides a composite molded body in which a rubber layer in the form of a thin film is formed on a surface of a resin molded body and a production method therefor. According to an embodiment of the present invention, a liquid composition containing a rubber component such as a rubber latex and a peroxide is applied to a surface of a resin molded body such as a polyamide-based resin having an amino group, causing crosslinking to occur in an uncrosslinked rubber layer and forming a crosslinked rubber layer in the form of a thin film. When a co-crosslinking agent is used in combination, adhesion to the resin molded body can be improved even when the thickness of the crosslinked rubber layer is small.

15 Claims, No Drawings

COMPOSITE MOLDED BODY AND PRODUCTION METHOD THEREFOR

TECHNICAL FIELD

The present invention relates to a composite molded body in which a crosslinked rubber layer having a small thickness is formed on a surface of a resin molded body and a production method (or molding method) thereof.

BACKGROUND ART

Known methods of directly adhering and compositing a molded body of a thermoplastic resin composition and a rubber member of a rubber composition include: methods that utilize miscibility of the molded body of the thermoplastic resin composition and the rubber member of the rubber composition; methods that react a reactive group of the molded body with a reactive group of the rubber member; and methods that utilize radicals generated from a peroxide acting as a crosslinking agent for the rubber composition.

An example of the methods that utilize miscibility is described in JP 09-124803 A (Patent Document 1), which proposes obtaining a composite member by heating and adhering an acrylonitrile-containing thermoplastic resin and an acrylonitrile-containing rubber. In another known method, an olefin resin and a rubber (EPDM) are co-extruded, and the olefin resin member is miscibilized and composited with the rubber member. However, with these methods, it is difficult to form a rubber layer having a small thickness even if it is possible to form the rubber composition into the shape of a sheet. In other words, even if extrusion molding is adopted to reduce the thickness of the rubber layer, it is difficult to form a uniform rubber layer with a thickness of 50 μm or less because the rubber composition has low fluidity and pulsates. Moreover, the components of the thermoplastic resin and the rubber are limited to those with miscibility, which leads to poor versatility and renders it difficult to bond the thermoplastic resin and the rubber layer in the form of a thin film in a wide range.

An example of the methods that utilize reaction of the reactive groups is described in JP 03-138114 A (Patent Document 2), in which a composite is produced by vulcanizing a polyamide-based resin having a terminal amino group and a rubber composition (including a peroxide, a vulcanization activator, and an alkoxysilane compound) having a carboxyl group or an acid anhydride group. Meanwhile, J P 2005-36147 A (Patent Document 3) describes performing injection molding of a resin composition having an amino group at a resin element having an amino group and a vulcanized rubber member containing an acid-modified rubber, bonding the resin element and the vulcanized rubber member directly. However, these methods have the same problems as the methods that utilize miscibility. Furthermore, sine these methods utilize the reaction between an amino group and a carboxyl group or an acid anhydride group, the types of resins and rubbers are greatly restricted.

An example of the methods that utilize radicals is described in JP 2002-273826 A (Patent Document 4), in which an unvulcanized rubber member containing a radical-generating agent is brought into contact with a resin member including a thermoplastic resin (such as a thermoplastic resin having a terminal amino group) containing a hydrogen atom at a predetermined concentration, the hydrogen atom having an orbital interaction energy coefficient S of not less than 0.006 calculated by semi-empirical molecular orbital method, and the unvulcanized rubber member is vulcanized by the radical-generating agent, resulting in a composite in which a vulcanized rubber member and the resin member are directly bonded. Meanwhile, JP 2011-110105 A (Patent Document 5) relates to a composite molded body for shoe soles in which a crosslinked rubber layer as a stud and a thermoplastic elastomer layer as a sole are laminated via a polyamide resin sheet; according to the description, a polyamide resin sheet having a predetermined amino group concentration and tensile elastic modulus is disposed in a mold, a uncrosslinked rubber composition including an uncrosslinked rubber, a peroxide, and a crosslinking auxiliary agent is melted and brought into contact with one surface of the sheet, and the uncrosslinked rubber composition is heated and crosslinked to form the composite molded body. However, with these methods, similar to what has been described above, since the rubber composition is molded and vulcanized in advance, a rubber layer in the form of a thin film cannot be formed on the resin member.

Also, with these methods, it is also conceivable to utilize transfer molding of the rubber composition, but it is substantially impossible to form a rubber layer in the form of a thin film from the perspective of rubber viscosity, moldability, mold structure, and the like.

Although calendering is a known method capable of reducing the thickness of a rubber layer, the limit of thin-wall molding by this calendering method is approximately 50 μm, plus it is difficult to form a uniform rubber thin film on a resin molded body; in particular, it is impossible to composite a rubber layer thinner than the thickness described above with a resin molded body.

CITATION LIST

Patent Document

Patent Document 1: JP 09-124803 A (Claims)
Patent Document 2: JP 03-138114 A (Claims)
Patent Document 3: JP 2005-36147 A (Claims)
Patent Document 4: JP 2002-273826 A (Claims)
Patent Document 5: JP 2011-110105 A (Claims)

SUMMARY OF INVENTION

Technical Problem

Therefore, an object of the present invention is to provide a composite molded body in which a crosslinked rubber layer in the form of a thin film is directly formed in close contact with a resin molded body and a production method therefor.

Another object of the present invention is to provide a composite molded body having excellent durability, of which a crosslinked rubber layer, despite being a thin film, adheres to a resin molded body with high adhesion, and a production method therefor.

Solution to Problem

As a result of investigating the method for forming a crosslinked rubber layer in the form of a thin film on a resin molded body, the present inventors discovered that the thickness of an uncrosslinked rubber layer can be greatly reduced when an organic peroxide is added to a rubber latex and the resulting mixture is applied to the resin molded body; and that when crosslinking occurs in the uncrosslinked rubber layer, adhesion to the resin molded body is greatly improved due to the action of radicals generated from the organic peroxide, and a composite molded body in which a uniform crosslinked rubber layer having a small thickness is integrated with the resin molded body can be obtained. Furthermore, it was also discovered that when the thickness of the crosslinked rubber layer decreases, the adhesion of the crosslinked rubber layer to the resin molded body decreases, which may be because the peel force cannot be absorbed by the thickness of the crosslinked rubber layer. Based on such knowledge, the present invention has been further studied and completed.

That is, the composite molded body according to an embodiment of the present invention includes a resin molded body and a crosslinked rubber layer bonded to a surface of the molded body, wherein the crosslinked rubber layer is a thin film (for example, having a thickness of approximately from 1 to 30 μm, preferably approximately from 5 to 25 μm), or is in the form of a coating film, that is bonded to the molded body. The crosslinked rubber layer that is a thin film is typically directly bonded to the surface of the molded body without using an adhesive.

The resin molded body may contain a thermoplastic resin having an amino group, for example, a polyamide-based resin having at least an amino group. The polyamide-based resin may be, for example, at least one selected from an aliphatic polyamide, an alicyclic polyamide, an aromatic polyamide, and a polyamide elastomer, and may have an amino group concentration from 5 to 300 mmol/kg. For example, the polyamide-based resin may include a $C_{8-18}$ alkylene chain and may have an amino group concentration of approximately from 20 to 250 mmol/kg.

The form of such a resin molded body is not limited, and may be, for example, a molded body having a one-dimensional, two-dimensional, or three-dimensional shape (that is, a molded body having a linear, planar, or tridimensional shape).

The crosslinked rubber layer may contain at least one rubber component selected from a styrene-butadiene rubber, an acrylonitrile-butadiene rubber, a chloroprene rubber, a butadiene rubber, an acrylic rubber, and a carboxyl group-modified rubber and a (meth)acrylate-modified rubber of the rubbers. Furthermore, the crosslinked rubber layer may be a peroxide crosslinked rubber layer crosslinked by at least a peroxide, and may be further crosslinked by a co-crosslinking agent.

The composite molded body can be produced by applying a liquid composition (coating composition in the form of a dispersion or solution) containing at least a rubber component and a peroxide to a surface of the molded body, causing crosslinking to occur in an uncrosslinked rubber layer (coating layer) formed on the molded body.

The liquid composition may contain at least a rubber latex and a peroxide. In other words, the rubber component may be a rubber component of the rubber latex. The ratio of the peroxide may be approximately from 0.3 to 3 parts by mass, and preferably approximately from 0.5 to 3 parts by mass, per 100 parts by mass of the rubber component. The liquid composition (or coating composition) may further contain a co-crosslinking agent, for example, at least one selected from an alkylene glycol di(meth)acrylate, a polyalkylene glycol di(meth)acrylate, an alkane polyol poly(meth)acrylate, a triallyl(iso)cyanurate, an arene bismaleimide, and a polyvalent metal salt of (meth)acrylic acid. The amount of such a co-crosslinking agent used may be approximately from 0.1 to 3 parts by mass, and preferably approximately from 0.2 to 2.5 parts by mass, per 100 parts by mass of the rubber component. The mass ratio of the crosslinking agent to the co-crosslinking agent may be, in the form of the former/the latter, approximately from 0.5/1 to 5/1.

Advantageous Effects of Invention

In an embodiment of the present invention, a uncrosslinked rubber layer in the form of a thin film can be formed on a surface of a resin molded body utilizing a liquid composition (coating composition), and a crosslinked rubber layer can be formed in close contact with the resin molded body utilizing radical reaction by a peroxide. In particular, since the radicals act in the crosslinking of the uncrosslinked rubber layer, even if the thickness of the crosslinked rubber layer is small, the crosslinked rubber layer can be formed with high adhesion to the resin molded body.

DESCRIPTION OF EMBODIMENTS

The resin molded body of the composite molded body according to an embodiment of the present invention may be formed from either a curable resin composition containing a thermosetting or a photocurable resin or a thermoplastic resin composition containing a thermoplastic resin, and is typically formed from a thermoplastic resin composition.

The type of the thermoplastic resin is not limited, and examples thereof include: olefin resins, such as polyethylene resins, polypropylene resins, modified or copolymerized olefin resins, and cyclic olefin resins; styrene-based resins, such as polystyrenes, styrene monomers alone or copolymers thereof such as acrylonitrile-styrene resins (AS resins), impact resistant polystyrene resins, rubber-reinforced styrene-based resins such as acrylonitrile-styrene-butadiene resins (ABS resins); (meth)acrylic resins; vinyl acetate based resins, or derivatives thereof, such as polyvinyl alcohol resins and polyvinyl acetal resins; vinyl chloride resins; polyester resins, such as polyethylene terephthalate resins, polybutylene terephthalate resins, polyalkylene arylate resins such as polyethylene naphthalate resins, and polyarylate resins; polycarbonate resins; polyamide-based resins; ketone resins; polyurethane resins; thermoplastic polyimide resins; polyacetal resins; polyether resins, such as polyphenylene ether resins, polyether ketone resins, and polyether ether ketone resins; polyphenylene sulfide resins; polysulfone resins, such as polysulfone resins and polyethersulfone resins; liquid crystal plastics, such as liquid crystal aromatic polyester resins; thermoplastic elastomers, such as olefinic elastomers, styrenic elastomers, polyester elastomers, polyamide elastomers, polyurethane elastomers, and fluorine elastomers. These thermoplastic resins can be used alone or in a combination of two or more.

Depending on the type of the thermoplastic resin, the melting point or glass transition temperature of the thermoplastic resin can be selected from, for example, a range of approximately from −125° C. to 350° C. such as from −50° C. to 300° C., and may be approximately from 100° C. to 300° C. such as from 125° C. to 280° C., and is preferably approximately from 150° C. to 275° C. such as from 170° C. to 270° C., more preferably approximately from 180° C. to 260° C. such as from 200° C. to 250° C.

The thermoplastic resin may have a functional group (reactive group) such as a hydroxyl group, a carboxyl group, and an amino group, and may include, for example, an aromatic polyester resin, such as a polyalkylene arylate resin or a polyarylate resin, which may have a carboxyl group at the terminal. Preferred thermoplastic resins may have active sites for radicals, such as a sulfur atom, a methyl group that may be substituted with an arene ring, a methine group, an active methylene group adjacent to a carbonyl group or an amino group, and an amino group, and may contain, for example, a resin having a methyl group such as a polypropylene resin, a resin having a sulfur atom adjacent to a phenylene group such as a polysulfone resin such as a polyphenylene sulfone resin, a resin having a methyl group substituted with a phenylene group such as a polyether resin such as a polyphenylene ether resin such as poly(2,5-dimethylphenylene)ether, a polyamide-based resin having an amino group and/or a carboxyl group, and in particular, a polyamide-based resin having an amino group and/or a methylene group adjacent to an amino group. The thermoplastic resin preferably contains a thermoplastic resin having an amino group, for example, a polyamide-based resin having at least an amino group.

The polyamide-based resin includes a polyamide resin, including homopolyamide or copolyamide resins, and a polyamide elastomer (polyamide block copolymer), and can be formed from an amide-forming component of any one of (a) to (c) below.

(a) A first amide-forming component including an alkylene diamine component and an alkane dicarboxylic acid component in combination; (b) A second amide-forming component composed of at least either a lactam component or an aminocarboxylic acid component; and (c) The first amide-forming component and the second amide-forming component.

That is, the polyamide-based resin can be formed from any of the amide-forming components (a) to (c), namely, the first amide-forming component, the second amide-forming component, or the combination of the first amide-forming component and the second amide-forming component, and the polyamide elastomer can be prepared using a polyamide formed from any one of the amide-forming components (a) to (c). Note that a lactam component and an aminocarboxylic acid component having the same carbon number and branched chain structure can be considered as equivalent components to each other.

The polyamide resin may be any one of an aliphatic polyamide resin, an alicyclic polyamide, and an aromatic polyamide, but is usually an aliphatic polyamide in many cases. Furthermore, the copolyamide resin (copolymerized polyamide resin) may be, for example, a copolyamide resin formed from the first amide-forming components having a different number of carbons; a copolyamide resin formed from the second amide-forming components having a different number of carbons; a copolyamide resin containing the first amide-forming component and the second amide-forming component. A copolyamide resin formed from the first amide-forming components having a different number of carbons and/or the second amide forming components having a different number of carbons may be referred to as a "first copolyamide resin", while a copolyamide resin containing the first and/or second amide-forming components or a component from which these amide-forming components are formed and a copolymerization component (alicyclic or aromatic component) may be referred to as a "second copolyamide resin".

Examples of the alkylene diamine component include: a $C_{4-18}$ alkylene diamine such as tetramethylenediamine, hexamethylenediamine, trimethylhexamethylenediamine, octamethylenediamine, decanediamine, dodecanediamine, tetradecanediamine, and octadecanediamine. These diamine components can be used alone or in a combination of two or more. Preferred diamine components include at least a $C_{6-18}$ alkylene diamine, preferably a $C_{8-16}$ alkylene diamine, in particular a $C_{10-14}$ alkylene diamine such as dodecanediamine.

Examples of the alkane dicarboxylic acid component include a $C_{4-36}$ alkane-dicarboxylic acid such as a $C_{8-36}$ alkane-dicarboxylic acid, for example, a suberic acid, an azelaic acid, a sebacic acid, a dodecanedioic acid, and an octadecanedioic acid. These dicarboxylic acid components can be used alone or in a combination of two or more. Preferred dicarboxylic acid components include a $C_{8-18}$ alkane dicarboxylic acid, for example, a $C_{10-16}$ alkane dicarboxylic acid, and preferably a $C_{12-14}$ alkane dicarboxylic acid.

In the first amide-forming component, the diamine component can be used in a range of approximately from 0.8 to 1.2 mol, and preferably approximately from 0.9 to 1.1 mol, per 1 mol of the dicarboxylic acid component.

Examples of the lactam component include a $C_{8-20}$) lactam such as ω-octanelactam, ω-nonanlactam, ω-decanelactam, ω-undecanelactam, ω-laurolactam (or ω-laurinlactam or dodecane lactam), and ω-tridecanelactam. Examples of the aminocarboxylic acid component include a $C_{8-20}$ aminocarboxylic acid such as ω-aminodecanoic acid, ω-aminoundecanoic acid, ω-aminododecanoic acid, and ω-aminotridecanoic acid. These lactam components and aminocarboxylic acid components can also be used alone or in a combination of two or more.

Preferred lactam components are, for example, a $C_{8-18}$ lactam, preferably a $C_{10-16}$ lactam such as a $C_{10-15}$ lactam, and more preferably a $C_{10-14}$ lactam such as a $C_{11-13}$ lactam; and preferred aminocarboxylic acid components have the same number of carbons as the preferred lactam components mentioned above. In particular, the lactam component and/or the aminocarboxylic acid component often contains at least a $C_{11-12}$ lactam component and/or aminocarboxylic acid component (undecanelactam, laurolactam (or laurinlactam), aminoundecanoic acid, aminododecanoic acid, etc.), for example, a lactam component and/or an aminocarboxylic acid having 12 carbons.

In the first copolyamide resin, the ratio (molar ratio) of the first amide-forming component to the second amide-forming component can be selected from the range of, in the form of the former/the latter, from 100/0 to 0/100, for example, approximately from 90/10 to 0/100 such as from 80/20 to 5/95, preferably approximately from 75/25 to 10/90 such as from 70/30 to 15/85, and even more preferably approximately from 60/40 to 20/80.

The preferred polyamide resins contain a component having at least a $C_{8-18}$ alkylene chain (or a linear alkylene chain), for example, a $C_{8-16}$ alkylene chain such as a $C_{9-15}$ alkylene chain, preferably a $C_{10-14}$ alkylene chain such as a $C_{11-14}$ alkylene chain, and more preferably a $C_{11-13}$ alkylene chain such as a $C_{11-12}$ alkylene chain, as the first and/or second amide-forming component.

Note that, the polyamide resin using the component having a $C_{8-18}$ alkylene chain (or linear alkylene chain) as the first and/or second amide-forming component may be a homopolyamide resin or a first copolyamide resin which is a copolymer of at least the component having a $C_{8-18}$ alkylene chain, for example, a copolymer having a $C_{8-18}$ alkylene chain and a plurality of components having different numbers of carbons, or a copolymer of the component having a $C_{8-18}$ alkylene chain and the first and/or second amide-forming component of a short chain (the $C_{4-6}$ alkylene chain.

In addition, the copolyamide resin, if necessary, may be a copolymer (second copolyamide resin) of a copolymerization component that is copolymerizable with the first and/or second amide-forming component, and the diamine component as the copolymerization component may be an alicyclic diamine component or an aromatic diamine component such as metaxylylene diamine; examples of the alicyclic diamine component include: a diamino $C_{5-10}$ cycloalkane such as diaminocyclohexane; a bis(amino $C_{5-8}$ cycloalkyl) $C_{1-3}$ alkane such as bis(4-aminocyclohexyl)methane, bis(4-amino-3-methylcyclohexyl)methane, and 2,2-bis(4-aminocyclohexyl)propane; and hydrogenated xylylenediamine. Further, the dicarboxylic acid component as the copolymerization component may be an alicyclic dicarboxylic acid component, such as a $C_{5-10}$ cycloalkane-dicarboxylic acid such as cyclohexane-1,4-dicarboxylic acid and cyclohexane-1,3-dicarboxylic acid, or may be an aromatic dicarboxylic acid, such as a terephthalic acid and an isophthalic acid. Note that an alicyclic diamine component and/or an alicyclic dicarboxylic acid component may be used to form an alicyclic polyamide resin such as a transparent polyamide. Furthermore, an aromatic diamine component such as xylylenediamines may be used to form an aromatic polyamide resin such as polyamide MXD-6, while an aromatic dicarboxylic acid component such as terephthalic acid may be used to form an aromatic polyamide resin (a polyamide resin such as a non-crystalline polyamide using terephthalic acid and hexamethylenediamine as reaction components.

The polyamide resin formed from such a component has excellent adhesion to the rubber layer and is useful for forming a uniform and tough crosslinked rubber layer on the surface of the composite molded body.

The ratio of the first and second amide-forming components may be approximately from 70 to 100 mol %, preferably approximately from 80 to 100 mol % such as from 85 to 97 mol %, and more preferably approximately from 90 to 100 mol % relative to the total amount of the component of the polyamide resin. Preferred polyamide resins include a homopolyamide resin or a copolyamide resin in which the ratio of the component having a $C_{8-18}$ alkylene chain, preferably a $C_{8-16}$ alkylene chain, more preferably a $C_{10-14}$ alkylene chain, even more preferably $C_{11-13}$ alkylene chain, relative to the total amount of the first and second amide-forming components is approximately from 70 to 100 mol % such as from 75 to 98 mol %, preferably approximately from 80 to 100 mol % such as from 85 to 95 mol %, more preferably approximately from 90 to 100 mol % such as from 95 to 100 mol %. Particularly preferred polyamide resins include a homopolyamide resin or a copolyamide resin containing at least one selected from a $C_{11-13}$ lactam and/or $C_{11-13}$ aminocarboxylic acid, such as laurolactam, aminoundecanoic acid, and aminododecanoic acid, as an amide-forming component.

Note that the polyamide resin may be a modified polyamide such as a polyamide having a branched chain structure introduced using a small amount of a polycarboxylic acid component and/or a polyamine component.

The polyamide resin may be, for example, polyamide 46, polyamide 6, and polyamide 66, but is preferably a polyamide resin having a long alkylene chain.

Examples of such a polyamide resin include: a homopolyamide resin, such as polyamide 8, polyamide 9, polyamide 10, polyamide 11, polyamide 12, polyamide 13, polyamide 610, polyamide 611, polyamide 612, polyamide 911, polyamide 912, polyamide 1010, and polyamide 1012; and a copolyamide, such as polyamide 6/10, polyamide 6/11, polyamide 6/12, polyamide 10/10, polyamide 10/12, polyamide 11/12, polyamide 12/13, polyamide 12/18, and polyamide 14/18. These polyamide resins can be used alone or in a combination of two or more. Note that in the polyamide resin, a component separated by the mark "/" indicates the first or second amide-forming component. In particular, a polyamide resin having a long alkylene chain, such as polyamide 610, polyamide 612, polyamide 6/10, polyamide 6/11, polyamide 6/12, polyamide 1010, polyamide 1012, polyamide 10, polyamide 11, and polyamide 12, are often used.

Examples of the polyamide elastomer (polyamide block copolymer) include a polyamide block copolymer formed from a polyamide segment corresponding to the polyamide resin mentioned above, such as polyamide 11 or polyamide 12, as a hard segment (or hard block) and a soft segment (or soft block), and the soft segment may be formed from, for example, a polyether, a polyester, or a polycarbonate. A typical polyamide elastomer is a polyamide-polyether block copolymer, and an example is a polyether amide such as a block copolymer of a polyamide block having dicarboxyl terminal end and a poly $C_{2-6}$ alkylene glycol block, or a polyoxyalkylene block, having a diamine terminal end. The polyamide elastomer may have an ester bond.

The number average molecular weight of the soft segment calibrated with polystyrene, as measured by gel permeation chromatography (GPC), for example, may be selected from the range of approximately from 100 to 10000, and may be approximately from 500 to 5000 such as from 500 to 3000, preferably approximately from 1000 to 2000. The ratio (mass ratio) of the polyamide segment to the soft segment may be, for example, in the form of the former/the latter, approximately from 75/25 to 10/90, and preferably approximately from 70/30 to 15/85.

These polyamide-based resins may be used alone or in combination of two or more types. Of these polyamide-based resins, the polyamide resin and the polyamide elastomer are preferable.

The polyamide-based resin preferably has an amino group, in particular, a terminal amino group, for the purpose of increasing adhesion to the rubber layer. The amino group concentration (unit: mmol/kg) of the polyamide-based resin can be selected from a range of approximately from 5 to 300 such as from 20 to 250, and may be, for example, approximately from 25 to 225 such as from 30 to 200, preferably approximately from 40 to 180 such as from 50 to 150, and more preferably approximately from 55 to 150 such as from 60 to 125. When the amino group concentration of the polyamide-based resin is high, the adhesion between the resin molded body and the crosslinked rubber layer can be greatly increased.

In the polyamide-based resin, the concentration of the amino group is preferably higher than the concentration of the carboxyl group. The ratio of the amino group to the carboxyl group ($NH_2$/COOH: molar ratio) in the polyamide-based resin may be, for example, approximately from 55/45 to 100/0 such as from 60/40 to 95/5, and preferably approximately from 65/35 to 100/0 such as from 70/30 to 90/10, and may also be approximately from 60/40 to 85/15.

The amino group concentration and the carboxyl group concentration can be measured by a known method, for example, a titration method. For example, the amino group concentration can be measured by dissolving a sample of the polyamide resin in a mixed solvent of phenol and ethanol at a volume ratio of 10:1 to prepare a 1 wt. % solution, then performing neutralization titration with a 1/100 N HCl aqueous solution. Meanwhile, the carboxyl group concentration can be measured by dissolving a sample of the polyamide resin in benzyl alcohol to prepare a 1 wt. % benzyl alcohol solution, then performing neutralization titration with a 1/100 N KOH aqueous solution.

The polyamide-based resin may be amorphous, but usually has crystallinity in many cases. The degree of crystallinity of the polyamide-based resin may be, for example, approximately from 1 to 50% such as from 1 to 30%, preferably approximately from 5 to 25%, and more preferably approximately from 10 to 20%. Note that the degree of crystallinity can be measured by a known method, for example, a measuring method based on density or heat of fusion, an X-ray diffraction method, or an infrared absorption method.

The melting point of the polyamide-based resin may be, for example, approximately from 150 to 260° C. such as from 160 to 250° C., and preferably approximately from 165 to 230° C. such as from 170 to 220° C., or may be approximately from 170 to 235° C. such as from 175 to 225° C. The melting point of the crystalline polyamide-based resin can be measured by a differential scanning calorimetry (DSC). The melting point of the polyamide-based resin refers to the temperature corresponding to the peak on the high temperature side among the plurality of peaks when a plurality of peaks are present in the DSC.

The number average molecular weight of the polyamide-based resin (unit:×$10^4$) may be selected from a range of, for example, approximately from 0.5 to 20 such as from 0.7 to 15, and may be approximately from 0.8 to 10 such as from 0.9 to 8, preferably approximately from 1 to 7 such as from 1 to 5. The molecular weight of the polyamide-based resin can be measured in calibration with polymethyl methacrylate by gel permeation chromatography using hexafluoroisopropanol (HFIP) as a solvent.

The resin composition may optionally include various additives, for example, a stabilizer such as a heat-resistant stabilizer, a weather-resistant stabilizer, an antioxidant, and a UV absorber; a colorant; a filler; a plasticizer; a lubricant; a flame retardant; an antistatic agent; and a silane coupling agent. The resin composition may also contain a reinforcing agent, for example, a granular reinforcing agent such as a calcium carbonate, a barium sulfate, a titanium oxide, a silica, an alumina, a mica, a clay, a talc, a carbon black, and a ferrite; or a fibrous reinforcing agent, with examples being an organic fiber such as a rayon, a nylon, a vinylon, and an aramid, and an inorganic fiber such as a glass fiber, a carbon fiber, a metal fiber, and a whisker. A preferred reinforcing agent is a fibrous reinforcing agent such as a glass fiber. The content of the reinforcing agent may be, for example, approximately from 5 to 50 parts by mass, and preferably approximately from 10 to 40 parts by mass, per 100 parts by mass of the resin of the resin composition. The additives can be used alone or in a combination of two or more.

The form of the molded body of such a resin composition is not limited, and may be, for example, a molded body having a one-dimensional, two-dimensional, or three-dimensional shape, that is: a linear molded body in the shape of, for example, fiber, a thread, or a rod; a planar or plate-shaped molded body such as a film or a sheet; or a tridimensional molded body such as a casing. The linear molded body may be a twisted yarn, while the molded body having a two-dimensional shape may be a fabric that is woven or non-woven. In addition, the molded body may be a secondary molded body, such as the fabric, obtained by processing a primary molded body, such as an injection molded body, an extrusion molded body, and a spinning molded body, formed by various molding means.

The crosslinked rubber layer is bonded to the surface of such a resin molded body. In particular, the crosslinked rubber layer can be bonded to the resin molded body with extremely high adhesion, and it is usually difficult to peel the crosslinked rubber layer from the resin molded body; this may be because the crosslinked rubber layer is bonded or adhered, directly or by covalent bonds, to the surface of the molded body under the action of radicals generated from the peroxide (such as hydrogen abstraction reaction).

The type of the rubber component of the crosslinked rubber layer is not limited, and examples include a diene rubber, an acrylic rubber, an olefin rubber, a fluorine rubber, a silicone rubber, an epichlorohydrin rubber, a chlorosulfonated polyethylene, a propylene oxide rubber, an ethylene-vinyl acetate copolymer (EAM), a polynorbornene rubber, and a modified rubber of the rubbers mentioned above. These rubber components can be used alone or in a combination of two or more.

Examples of the diene rubber include: a polymer of diene monomers such as a natural rubber (NR), an isoprene rubber (IR), an isobutylene-isoprene rubber (butyl rubber) (IIR), a chloroprene rubber (CR), and a butadiene rubber (BR); a styrene-diene copolymer rubber such as a styrene-butadiene rubber (SBR, for example, a SB random copolymer and a SB block copolymer), a styrene-chloroprene rubber (SCR), and a styrene-isoprene rubber (SIR); an acrylonitrile-diene copolymer rubber such as a acrylonitrile-butadiene rubber (nitrile rubber) (NBR), a nitrile-chloroprene rubber (NCR), and a nitrile-isoprene rubber (NIR). Examples of the diene rubber also include a hydrogenated rubber such as a hydrogenated nitrile rubber (HNBR).

Examples of the acrylic rubber include a rubber containing an alkyl acrylate as the main component, such as: ACM, a copolymer of alkyl acrylate and chlorine-containing crosslinkable monomers; ANM, a copolymer of alkyl acrylate and acrylonitrile; a copolymer of alkyl acrylate and monomers containing a carboxyl group and/or an epoxy group; and an ethylene-acrylic rubber.

Examples of the olefin rubber include ethylene-propylene rubbers (EPMs), ethylene-propylene-diene rubbers (such as EPDMs), and polyoctenylene rubbers.

Examples of the fluorine rubber include a rubber using a fluorine-containing monomer, for example: FKM, a copolymer of vinylidene fluoride, perfluoropropene and, if necessary, tetrafluoroethylene; a copolymer of tetrafluoroethylene and propylene; and FFKM, a copolymer of tetrafluoroethylene and perfluoromethyl vinyl ether.

Examples of the silicone rubber include a methyl silicone rubber (MQ), a vinyl silicone rubber (VMQ), a phenyl silicone rubber (PMQ), a phenyl vinyl silicone rubber (PVMQ), and a fluorosilicone rubber (FVMQ).

Examples of the modified rubber include: a carboxyl group modified rubber, for example, a rubber having a carboxyl group or an acid anhydride group such as a carboxylated styrene butadiene rubber (X-SBR), a carboxylated nitrile rubber (X-NBR), and a carboxylated ethylene propylene rubber (X-EPM); a (meth)acrylate-modified rubber such as a methyl (meth)acrylate copolymerized styrene-butadiene rubber.

The rubber component may be used in the form of a dispersion or in the form of a solution in which the rubber component is dissolved in an organic solvent. Depending on the type of rubber component, examples of the organic solvent include: a hydrocarbon-based solvent, with examples being an aromatic hydrocarbon such as toluene and xylene, an alicyclic hydrocarbon such as cyclohexane, and an aliphatic hydrocarbon such as hexane; an ester-based solvent such as ethyl acetate; a ketone-based solvent such as methyl ethyl ketone and methyl isobutyl ketone; an ether-based solvent such as tetrahydrofuran; a sulfoxide-based solvent such as dimethyl sulfoxide; and an amide-based solvent such as dimethylacetamide and N-methylpyrrolidone. These organic solvents can be used alone or in a combination of two or more.

Preferred rubber components are in the form of an aqueous dispersion (emulsion or latex), especially in the form of a rubber latex. In the related art, thin rubber molded articles have been produced using rubber latexes, but crosslinking of rubber components of rubber latexes using peroxides such as organic peroxides is not known. Furthermore, there is no known example in which a rubber latex is composited and integrated with a resin molded body due to the action of radicals generated from an organic peroxide.

The rubber component of the rubber latex may be, for example, a natural rubber (NR) or an isoprene rubber (IR), a styrene-butadiene rubber, a acrylonitrile-butadiene-based rubber, a chloroprene rubber, a butadiene rubber, an acrylic rubber, and a carboxyl group modified rubber and a (meth) acrylate-modified rubber of the rubbers mentioned above. The latex may be a soap-free latex prepared without the use of an emulsifier. These rubber components can be used alone or in a combination of two or more.

The SBR, such as a SBR latex, may be either a low styrene latex having a low bound styrene content such as less than 50 mass % or a resin latex having a high styrene content such as 50 mass % or above; furthermore, the resin latex may be a high styrene latex having a styrene content of approximately from 70 to 80 mass %, and may be a medium styrene latex having a styrene content of approximately from 50 to 70 mass %. A low styrene latex is advantageous for forming a crosslinked rubber layer on the resin molded body to increase the frictional resistance.

In the rubber latex, the average particle size of rubber component particles can be selected from a range of approximately from 1 nm to 3 μm, and may normally be approximately from 5 nm to 1 μm such as from 10 to 700 nm, and preferably approximately from 20 to 500 nm such as from 50 to 400 nm, as long as the uniformity of the coating film is not impaired. The average particle size is expressed by the volume average primary particle size and can be measured by a particle size measuring device using a laser diffraction scattering method or the like.

The concentration of the rubber component of the rubber latex is not limited and may be, for example, approximately from 30 to 70 mass %, preferably from 35 to 55 mass %, and more preferably approximately from 40 to 50 mass % in terms of solid content.

The uncrosslinked rubber (or unvulcanized rubber) is crosslinked by at least a crosslinking agent to form a crosslinked rubber layer. The crosslinked rubber layer may be formed by sulfur vulcanization, but is typically formed by crosslinking using a peroxide, to form a peroxide vulcanized rubber layer.

The peroxide (crosslinking agent) may be any compound capable of generating a radical, and may be a water-soluble or inorganic peroxide, with examples being hydrogen peroxide and a persulfate such as ammonium persulfate and potassium persulfate, or may be an organic peroxide. A water-insoluble peroxide (organic peroxide) is often used as the peroxide (crosslinking agent).

Examples of the organic peroxide (or peroxide) include: a peroxy acid, such as peracetic acid, perbenzoic acid, and perchlorobenzoic acid; a hydroperoxide, such as t-butyl hydroperoxide, t-amyl hydroperoxide, 1,1,3,3-tetramethyl-butyl hydroperoxide, and cumene hydroperoxide; a dialkyl peroxide, such as 2,2-di-t-butyl peroxide, dicumyl peroxide, di-t-amyl peroxide, t-butyl-cumyl peroxide, 2,5-dimethyl-2,5-di(t-butyl peroxy)hexane, 1,1-bis(t-butyl peroxy)-3,3,5-trimethylcyclohexane, 2,5-dimethyl-2,5-di(t-butylperoxy)hexane-3,1,3-bis(t-butyl peroxy isopropyl)benzene, and 2,5-dimethyl-2,5-benzoylperoxyhexane; a diacyl peroxide, such as di-t-butyl peroxide, dilauroyl peroxide, dicumyl peroxide, 2,5-dimethyl-2,5-di(t-butylperoxy)hexane, 2,5-dimethyl-2,5-di(t-butylperoxy)hexyne-3, di-t-amyl peroxide, dibenzoyl peroxide, di(4-chlorobenzoyl) peroxide, di(2,4-dichlorobenzoyl) peroxide, benzoyl toluyl peroxide, and di-toluyl peroxide (di(o-methylbenzoyl) peroxide); a ketone peroxide such as methyl ethyl ketone peroxide; a peroxycarbonate, such as di(2-ethylhexyl peroxy) dicarbonate, di(isopropyl peroxy) dicarbonate, t-butyl peroxy isopropyl carbonate, t-butyl peroxy 2-ethylhexyl carbonate, 1,6-bis(t-butyl peroxycarbonyloxy)hexane, t-amyl peroxy isopropyl carbonate, t-amyl peroxy 2-ethylhexyl carbonate, and di(2-ethylhexyl)peroxydicarbonate; a peroxyketal, such as 2,2-bis(t-butyl peroxy)butane, 2,2-bis(4,4-di-t-butylperoxy cyclohexyl)propane, 1,1-di(tert-butylperoxy)cyclohexane, and 1,1-di(t-amylperoxy)cyclohexane; an alkyl perester (or alkyl peroxy ester), such as t-butyl peroxy acetate, t-butyl peroxyisobutyrate, t-butyl peroxy 2-ethylhexanoate, t-butyl peroxy 3,5,5-trimethylhexanoate, t-butyl peroxy neoheptanoate, t-butyl peroxy neodecanoate, t-butyl peroxypivalate, t-butyl peroxyisonanoate, t-butyl peroxybenzoate, di-t-butyl peroxy hexahydroterephthalate, t-amyl peroxyacetate, t-amyl peroxy 2-ethylhexanoate, t-amyl peroxy 3,5,5-trimethylhexanoate, t-amyl peroxypivalate, t-amyl peroxyneodecanoate, t-amyl peroxyisononanoate, t-amyl peroxybenzoate, cumyl peroxy neodecanoate, 1,1,3,3-tetramethylbutyl peroxy 2-ethylhexanoate, 1,1,3,3-tetramethylbutyl peroxy neodecanoate, and 3-hydroxy-1,1-dimethylbutyl peroxyneodecanoate.

These peroxides may be used alone or in a combination of two or more. Hydroperoxides, dialkyl peroxides, diacyl peroxides, peroxycarbonates, peroxyketals, and alkyl peresters are often used as the peroxide.

The ratio of the crosslinking agent (such as a peroxide) may be any ratio as long as the uncrosslinked rubber component can be crosslinked (or vulcanized). For example, the ratio of the crosslinking agent can be selected from a range of approximately from 0.3 to 3 parts by mass such as from 0.5 to 3 parts by mass, and may be approximately from 0.6 to 2.5 parts by mass such as from 0.7 to 2.2 parts by mass, preferably approximately from 0.75 to 2 parts by mass such as from 0.8 to 1.7 parts by mass), and may be approximately from 0.8 to 3 parts by mass such as from 1 to 3 parts by mass, preferably from 1 to 2.5 parts by mass, per 100 parts by mass of the rubber component (uncrosslinked rubber component). If the amount of the crosslinking agent (such as a peroxide) used is too small, adhesion to the resin molded body will tend to decline; and if the amount of the crosslinking agent used is too large, adhesion to the resin molded body will tend to decline, which may be because the hardness of the crosslinked rubber layer becomes too high.

In order to increase the adhesion of the crosslinked rubber layer to the resin molded body even when the crosslinked rubber layer has a small thickness, the crosslinked rubber layer may be further crosslinked by a co-crosslinking agent.

The co-crosslinking agent (vulcanization activator or crosslinking auxiliary agent) can be selected based on, for example, the type of the crosslinking agent, and examples of the co-crosslinking agent include: a polyfunctional vinyl or allyl monomer, such as, diallyl phthalate (DAP), triallyl cyanurate (TAC), triallyl isocyanurate (TAIC), and triallyl trimellitate; a polyfunctional (meth)acrylic monomer; a polyfunctional maleimide compound; a polyvalent metal salt of (meth)acrylic acid, for example, a salt formed of a multivalent metal such as zinc, a magnesium salt, calcium, barium, strontium, nickel, copper, aluminum, and neodymium, and a methacrylic acid in a multiple amount corresponding to the valence of the multivalent metal, such as zinc methacrylate (MAAZn); 1,2-polybutadiene (1,2-Pb); and a sulfur-containing phenolic compound, such as "Sanceler AP" available from Sanshin Chemical Industry Co., Ltd. These co-crosslinking agents can be used alone or in a combination of two or more.

Examples of the polyfunctional (meth)acrylic monomer include a bifunctional (meth)acrylate and a trifunctional or polyfunctional (meth)acrylate. Examples of the bifunctional (meth)acrylate include: an alkylene glycol di(meth)acrylate, such as ethylene glycol di(meth)acrylate (EGDMA), propylene glycol di(meth)acrylate, and a butanediol di(meth) acrylate (BDDMA) such as 1,3-butanediol di(meth)acrylate and 1,4-butanediol di(meth)acrylate; a polyalkylene glycol di(meth)acrylate, such as diethylene glycol di(meth)acrylate, polyethylene glycol di(meth)acrylate (PEGDMA), dipropylene glycol di(meth)acrylate, and polytetramethylene glycol di(meth)acrylate, and a di(meth)acrylate of $C_{2-4}$ alkylene oxide adduct of bisphenol A. Examples of the trifunctional or polyfunctional (meth)acrylate include: an alkane polyol poly(meth)acrylate, such as glycerintri(meth) acrylate, trimethylolethane tri(meth)acrylate, trimethylolpropane tri(meth)acrylate (TMPTMA), pentaerythritol tri (meth)acrylate, pentaerythritol tetra(meth)acrylate, and dipentaerythritol tetra(meth)acrylate.

Examples of the polyfunctional maleimide compound include: an arene bismaleimide or aromatic bismaleimide, and an aliphatic bismaleimide. Examples of the arene bismaleimide or aromatic bismaleimide include: an arene bismaleimide, for example, a phenylene dimaleimide (PBMs) such as N,N'-1,3-phenylenedimaleimide and N,N'-1,4-phenylenedimaleimide, N,N'-3-methyl-1,4-phenylenedimaleimide, and naphthalene dimaleimide; 4,4'-bis(N,N'-maleimide)diphenylmethane; 4,4'-bis(N,N'-maleimide)diphenylsulfone; and 4,4'-bis(N, N'-maleimide) diphenylether. Examples of the aliphatic bismaleimide include: N,N'-1,2-ethylene bismaleimide, N,N'-1,3-propylene bismaleimide, and N,N'-1,4-tetramethylene bismaleimide.

Preferred co-crosslinking agents (crosslinking auxiliary agents) include: triallyl (iso)cyanurate) such as TAC and TAIC; a $C_{2-10}$ alkylene glycol di(meth)acrylate such as EGDMA and BDDMA, preferably a $C_{2-6}$ alkylene glycol di(meth)acrylate; a poly $C_{2-4}$ alkylene glycol di(meth)acrylate such as PEGDMA, for example, a di- or tri-$C_{2-4}$ alkylene glycol di(meth)acrylate; a $C_{3-10}$ alkane polyol poly (meth)acrylate such as TMPTMA, for example, a $C_{4-8}$ alkane tri- to hexaol poly(meth)acrylate, preferably a $C_{4-6}$ alkane tri- to hexaol tri- or hexa(meth)acrylate; a polyvalent metal salt of (meth)acrylic acid, such as MAAZn); and a $C_{6-10}$ arene bismaleimide such as PBM, for example, phenylene bismaleimide. Among these, trimethylolpropane tri (meth)acrylate (TMPTMA) and phenylene bismaleimide (PBM) are useful for increasing the adhesion and heat resistance of the crosslinked rubber layer.

The amount of the co-crosslinking agent (crosslinking auxiliary agent) used can be selected based on the type of crosslinking agent (such as a peroxide), and can be, for example, approximately from 0.1 to 3 parts by mass such as from 0.2 to 2.5 parts by mass, preferably approximately from 0.25 to 2.3 parts by mass such as from 0.25 to 2.2 parts by mass, and can also be approximately from 0.2 to 2 parts by mass such as from 0.25 to 1.5 parts by mass, and preferably approximately from 0.3 to 1.2 parts by mass such as from 0.35 to 1 parts by mass, per 100 parts by mass of the rubber component. When a co-crosslinking agent is used in combination, adhesion of the crosslinked rubber layer to the resin molded body can be improved even when the crosslinked rubber layer is thin.

The mass ratio of the crosslinking agent to the co-crosslinking agent is, in the form of the former/the latter, for example, approximately from 0.5/1 to 5/1 such as from 0.5/1 to 4/1, preferably approximately from 0.7/1 to 4/1 such as from 0.8/1 to 3.5/1, and more preferably approximately from 0.9/1 to 3/1, or approximately from 0.7/1 to 3.5/1 such as from 0.75/1 to 2.5/1, and may be approximately from 0.5/1 to 2/1 such as from 0.6/1 to 1.8/1.

The uncrosslinked rubber composition may further optionally include various additives, for example: a filler, for example, a powdered or granular filler or a reinforcing agent such as a mica, a clay, a talc, a silica, a calcium carbonate, a magnesium carbonate, a carbon black, a white carbon, and a ferrite, and a fibrous filler or a reinforcing agent such as an organic fiber such as a rayon, a nylon, a vinylon, and an aramid, and an inorganic fiber such as a carbon fiber and a glass fiber; a softener, for example, a vegetable oil such as linoleic acid, oleic acid, castor oil, and palm oil, and a mineral oil such as paraffin, process oil, and an extender; a plasticizer such as a phthalate, an aliphatic dicarboxylate, a sulfur-containing plasticizer, and a polyester polymer plasticizer; a metal oxide that may function as a co-crosslinking agent, for example, a polyvalent metal oxide such as zinc oxide and titanium oxide; an age resistor, such as a thermal age resistor, an antiozonant, an antioxidant, and a UV absorber; a tackifier; a processing auxiliary agent; a lubricant such as a stearic acid, a metal stearate, and a wax; a flame retardant; an antistatic agent; and a coloring agent. These additives may be used alone or in a combination of two or more.

It is sufficient that the crosslinked rubber layer is a thin film, and depending on the application of the composite molded body, the thickness of the crosslinked rubber layer can be selected from a range of approximately from 1 to 50 μm such as from 3 to 40 μm, and may be, for example, approximately from 1 to 30 μm such as from 2 to 27 μm, preferably approximately from 5 to 25 μm such as from 7 to 20 μm, and more preferably approximately from 10 to 15 μm, and may usually be approximately from 3 to 25 μm such as from 4 to 12 μm, preferably from 5 to 10 μm.

Such a crosslinked rubber layer is formed uniformly even when having a small thickness, and is adhered to the resin molded body with high adhesion. Furthermore, the crosslinked rubber layer usually has a coating film form (in the form of a coating film).

Composite Member and Production Method Therefor

Such a composite molded body can be produced by applying a liquid composition (coating composition in the form of a solution or dispersion), which contains at least a rubber component, a peroxide, and optionally, a co-crosslinking agent, to a surface of the resin molded body (or forming an unvulcanized rubber layer using the liquid composition), and crosslinking or heating the unvulcanized rubber layer formed on the molded body. The liquid composition may be in the form of a solution or dispersion in which the rubber component is dissolved in an organic solvent, or may be in the form of a dispersion in which particles of the rubber component are dispersed. That is, the liquid composition (or the coating composition) can be prepared by mixing the rubber component, the crosslinking agent (such as a peroxide) and, optionally, the co-crosslinking agent in the presence of a solvent; the composition in the form of a solution can be prepared by mixing the rubber component with an organic solvent to dissolve it, while the composition in the form of an aqueous dispersion can be prepared by mixing an aqueous rubber latex with the components mentioned above. Preferred liquid compositions are in the form of an aqueous dispersion including at least a rubber latex and a peroxide.

Depending on the application of the composite molded body, it is sufficient that at least a portion of the resin molded body is coated with the liquid composition (the coating composition); the surface of the resin molded body may be entirely coated, or partially coated, with the liquid composition (the coating composition). When partially coating the surface, only one or a multiple predetermined sites may be coated, and the coating may be in any form, for example, in the form of parallel lines, intersecting lines (such as a lattice pattern), and scattered lines in a staggered state.

The thickness of the crosslinked rubber layer can be adjusted by the content of the rubber component, viscosity, number of applications, and the like of the liquid composition (the coating composition). In addition, various types of known methods can be used for coating, for example, dip coating, roll coating, gravure coating, screen printing, and ink jet printing.

After the uncrosslinked rubber layer (or coating film) is dried, the dried uncrosslinked rubber layer (or dried coating film) is heated to cause crosslinking (or vulcanization), thereby forming the crosslinked rubber layer (thin crosslinked rubber layer in the form of a coating film). The heating temperature can be selected according to the decomposition temperature of the peroxide, and may be, for example, approximately from 50 to 200° C., preferably approximately from 80 to 180° C., and more preferably approximately from 100 to 170° C. Furthermore, the heating time may be, for example, approximately from 1 to 30 minutes, preferably approximately from 2 to 25 minutes, and more preferably approximately from 3 to 20 minutes.

The thickness of the vulcanized rubber layer formed in this manner is small as described above, and the crosslinked rubber layer is firmly adhered to the resin molded body even when the thickness of the crosslinked rubber layer is small, which may be because radicals generated from the peroxide act at the interface between the resin molded body and the unvulcanized rubber layer, and hydrogen abstraction reaction, activation reaction, and the like occur at this interface. Moreover, since coating is performed with the rubber composition, even with low fluidity, in the form of a liquid composition (coating composition), the crosslinked rubber layer can be formed with a uniform surface and a uniform thickness including the surface.

Example

Hereinafter, the present invention is described in greater detail based on examples, but the present invention is not limited to these examples.

The following materials were used in the following examples and comparative examples.
Thermoplastic Resin
PA1: Nylon 12 Elastomer (available from Daicel-Evonik Ltd., with an amino group concentration of 60 mmol/kg, a carboxyl group concentration of 17 mmol/kg, and a melting point of 178° C.)

PA2: Nylon 612 (available from Daicel-Evonik Ltd., with an amino group concentration of 82 mmol/kg, a carboxyl group concentration of 23 mmol/kg, and a melting point of 215° C.)

PA3: Nylon 612 (available from Daicel-Evonik Ltd., with an amino group concentration of 100 mmol/kg, a carboxyl group concentration of 22 mmol/kg, and a melting point of 215° C.)

PA2GF20: Nylon 612 (available from Daicel-Evonik Ltd., with an amino group concentration of 81 mmol/kg, a carboxyl group concentration of 21 mmol/kg, and a melting point of 215° C., and containing 20 mass % of glass fiber)

Note that the amino group concentration and the carboxyl group concentration were measured by the neutralization titration method mentioned above. The melting point was measured using a differential scanning calorimeter (DSC).
Latex
L1: Styrene-butadiene latex ("Nipol C4850A", available from Zeon Corporation, with an average particle size (volume basis) of 300 nm, a glass transition temperature Tg of −47° C., and a solid content of 70 mass %)

L2: Carboxy-modified styrene-butadiene latex ("Nipol LX433C", available from Zeon Corporation, with an average particle size (volume basis) of 100 nm, a Tg of 50° C., and a solid content of 50 mass %)

L3: Acrylonitrile-butadiene latex ("Nipol 1562", available from Zeon Corporation, with an average particle size (volume basis) of 50 nm, a Tg of −21° C., and a solid content of 41 mass %)

L4: Carboxy-modified acrylonitrile-butadiene latex ("Nipol 1571H", available from Zeon Corporation, with an average particle size (volume basis) of 120 nm, a Tg of −8° C., and a solid content of 40 mass %)

L5: Acrylate latex ("Nipol LX811H", available from Zeon Corporation, with a Tg of 1° C. and a solid content of 50 mass %)

L6: Soap-free styrene-butadiene latex ("Nipol SX1503A", available from Zeon Corporation, with an average particle size (volume basis) of 50 nm, a Tg of −20° C., and a solid content of 42 mass %)
Crosslinking Agent (Organic Peroxide)
Crosslinking agent A: Dicumyl peroxide ("Perkadox BC-FF", available from Kayaku Akzo Corporation, with a peroxide content of 100 mass %)

Crosslinking agent B: 1,1-bis(t-butylperoxy)cyclohexane ("TRIGONOX 22-40D", available from Kayaku Akzo Corporation, with a peroxide content of 40 mass %)

Crosslinking agent C: di(o-methylbenzoyl) peroxide ("Perkadox 20-50S", available from Kayaku Akzo Corporation, with a peroxide content of 50 mass %)
Co-Crosslinking Agent
TMPTMA: Trimethylolpropane trimethacrylate ("Hi-Cross M", available from Seiko Chemical Co., Ltd.)

PBM: N,N'-m-phenylenebismaleimide ("HVA-2", available from DuPont)

Examples and Comparative Examples

Preparation of Composite Molded Body
The components were added in a container at the proportions shown in Tables 2 and 3 and stirred at 60° C. for 10 minutes to prepare liquid compositions. Note that in Tables 2 and 3, the amount of each component used is shown in parts by mass.

The obtained liquid compositions were applied to plate-shaped resin molded bodies using a bar coater, dried, and held for 10 minutes in an oven heated to 160° C. to form rubber layers (vulcanized rubber layers). Note that injection molded bodies having a thickness of 3 mm, a width of 70 mm, and a length of 100 mm were used as the plate-shaped resin molded bodies.

Evaluation of Adhesiveness

The composite molded bodies obtained in the examples and comparative examples were subjected to cross-cut test to examine the adhesiveness or adhesion of the rubber layers to the resin molded bodies. In a cross-cut test, a rubber layer was cut with a sharp cutter at 1 mm interval in the lengthwise and widthwise directions to form a lattice pattern; then, an adhesive tape ("CELLOTAPE (trade name)", available from Nichiban) was adhered to the area with the lattice pattern cut, and was peeled off vigorously.

Then, adhesiveness was evaluated according to the following criteria corresponding to the classifications presented in Table 1 below.

TABLE 1

| Classification | | | | | |
|---|---|---|---|---|---|
| 0 | 1 | 2 | 3 | 4 | 5 |
| State of peeling | | | | | Worse than that in classification 4 |

0: The edges of the cuts are completely smooth, and there is no peeling at the cross-cut area or the squares of the lattice (lattice squares)

1: There are small flakes of the coating film at the intersections of the cuts, but the cross-cut area affected (percentage of the peeling area) is not significantly greater than 5%

2: The coating film has flaked along the edges and/or at the intersections of the cuts, and the cross-cut area affected (percentage of the peeling area) is significantly greater than 5% but not significantly greater than 15%

3: The coating film has flaked along the edges partially or entirely in large pieces, and/or a few lattice squares have partially or completely detached; the cross-cut area affected (percentage of the peeling area) is significantly greater than 15% but not significantly greater than 35%

4: The coating film has flaked along the edges partially or entirely in large pieces, and/or many of the lattice squares have partially or completely detached; the cross-cut area affected (percentage of the peeling area) is not significantly greater than 65%

5: Adhesiveness is weaker than that of classification 4; the cross-cut area affected (percentage of the peeling area) is significantly greater than 65%.

The results are shown in Table 2 and Table 3.

TABLE 2

| | | Example 1 | Comparative Example 1 | Example 2 | Example 3 | Comparative Example 2 | Example 4 | Comparative Example 3 |
|---|---|---|---|---|---|---|---|---|
| Latex | Type | L2 | L2 | L1 | L1 | L1 | L3 | L3 |
| | Amount used | 100 | 100 | 100 | 100 | 100 | 100 | 100 |
| Crosslinking agent (Peroxide) | Type | A | — | A | A | — | B | — |
| | Amount used | 1.5 | — | 0.7 | 0.7 | — | 2.1 | — |
| Co-crosslinking agent | Type | — | — | TMPTMA | TMPTMA | — | PBM | — |
| | Amount used | — | — | 0.25 | 1.0 | — | 0.8 | — |
| Resin | Type | PA1 | PA1 | PA2 | PA2 | PA2 | PA3 | PA3 |
| Adhesion (Cross-cut test) | thickness of 30 μm | 1 | 5 | 0 | 0 | 5 | 0 | 5 |
| | thickness of 25 μm | 1 | 5 | 0 | 0 | 5 | 1 | 5 |
| | thickness of 10 μm | 2 | 5 | 1 | 0 | 5 | 1 | 5 |
| | thickness of 7 μm | 2 | 5 | 1 | 1 | 5 | 2 | 5 |

TABLE 3

| | | Example 5 | Example 6 | Example 7 | Example 8 | Example 9 |
|---|---|---|---|---|---|---|
| Latex | Type | L4 | L4 | L5 | L5 | L6 |
| | Amount used | 100 | 100 | 100 | 100 | 100 |
| Crosslinking agent (Peroxide) | Type | C | C | C | C | C |
| | Amount used | 2.2 | 1.5 | 1.0 | 1.0 | 0.84 |
| Co-crosslinking agent | Type | — | TMPTMA | PBM | TMPTMA | TMPTMA |
| | Amount used | — | 0.38 | 0.3 | 0.25 | 0.22 |
| Resin | Type | PA2GF20 | PA2GF20 | PA1 | PA1 | PA2 |
| Adhesion (Cross-cut test) | thickness of 30 μm | 1 | 1 | 0 | 0 | 0 |
| | thickness of 25 μm | 2 | 1 | 1 | 1 | 1 |
| | thickness of 10 μm | 2 | 1 | 1 | 2 | 1 |
| | thickness of 7 μm | 2 | 2 | 2 | 2 | 2 |

As is clear from Table 2 and Table 3, in the examples, even when the thickness of a crosslinked rubber layer is small, adhesion to resin molded body is high compared to that in the comparative examples. Furthermore, by using a co-crosslinking agent in combination, adhesion to the resin molded body can be improved even when the thickness of a crosslinked rubber layer becomes thinner.

INDUSTRIAL APPLICABILITY

Since the vulcanized rubber layer in the form of a thin film is firmly bonded to the resin molded body, a composite molded body according to an embodiment of the present invention can be used in various applications which utilize properties such as frictional resistance, rubber elasticity, and stickiness of the vulcanized rubber layer along with physical properties such as the mechanical properties of the resin molded body. For example, a composite molded body according to an embodiment of the present invention can be used as: a precision roller or feed member such as a paper feed roller that requires high grip performance (high frictional resistance) as well as high rigidity and dimensional accuracy; a gripping member for, for example, sport equipment; a resin adhesive film or sheet that can be temporarily attached to and detached from an adherend utilizing the stickiness of the vulcanized rubber layer; a gear requiring quietness; a fixing film which requires heat resistance and stickiness and is useful for fixing precision components such as circuit components, for example, a fixing film for fixing circuit components or the like in mobile electronic devices; or an adhesive sheet or dust filter for preventing dust and other debris from entering an indoor space.

The invention claimed is:

1. A composite molded body comprising a resin molded body and a crosslinked rubber layer bonded to a surface of the molded body, wherein the crosslinked rubber layer in the form of a thin film is bonded to the molded body, and
   the crosslinked rubber layer has a thickness of from 1 to 50 μm.

2. The composite molded body according to claim 1, wherein the resin molded body comprises a thermoplastic resin having an amino group.

3. The composite molded body according to claim 1, wherein the resin molded body comprises a polyamide-based resin having at least an amino group.

4. The composite molded body according to claim 1, wherein the resin molded body comprises a polyamide-based resin that has an amino group concentration from 5 to 300 mmol/kg and is at least one selected from an aliphatic polyamide, an alicyclic polyamide, an aromatic polyamide, and a polyamide elastomer.

5. The composite molded body according to claim 1, wherein the resin molded body comprises a polyamide-based resin having a $C_{8-18}$ alkylene chain and an amino group concentration from 20 to 250 mmol/kg.

6. The composite molded body according to claim 1, wherein the crosslinked rubber layer comprises at least one rubber component selected from a styrene-butadiene rubber, an acrylonitrile-butadiene rubber, a chloroprene rubber, a butadiene rubber, an acrylic rubber, and a carboxyl group-modified rubber and a (meth)acrylate-modified rubber of the rubbers mentioned above.

7. The composite molded body according to claim 1, wherein the crosslinked rubber layer is crosslinked by at least a peroxide and is formed to a thickness from 1 to 30 μm.

8. The composite molded body according to claim 1, wherein the crosslinked rubber layer is further crosslinked by a co-crosslinking agent.

9. The composite molded body according to claim 1, wherein the resin molded body is a molded body having a one-dimensional, two-dimensional, or three-dimensional shape.

10. A method of producing the composite molded body described in claim 1, the composite molded body having the crosslinked rubber layer formed on a surface of the resin molded body, the method comprising: applying a liquid composition including at least a rubber component and a peroxide to the surface of the resin molded body, and causing crosslinking to occur in an uncrosslinked rubber layer formed on the resin molded body.

11. The method according to claim 10, wherein the liquid composition comprises at least a rubber latex and a peroxide.

12. The method according to claim 10, wherein a ratio of the peroxide per 100 parts by mass of the rubber component is from 0.3 to 3 parts by mass.

13. The method according to claim 10, wherein the liquid composition further comprises at least one co-crosslinking agent selected from an alkylene glycol di(meth)acrylate, a polyalkylene glycol di(meth)acrylate, an alkane polyol poly(meth)acrylate, a triallyl(iso)cyanurate, an arene bismaleimide, and a polyvalent metal salt of (meth)acrylic acid.

14. The method according to claim 13, wherein the co-crosslinking agent is contained in a ratio from 0.1 to 3 parts by mass per 100 parts by mass of the rubber component.

15. The method according to claim 13, wherein the mass ratio of the crosslinking agent to the co-crosslinking agent is, in the form of the former/the latter, from 0.5/1 to 5/1.

* * * * *